United States Patent
Long et al.

(10) Patent No.: US 11,218,541 B2
(45) Date of Patent: Jan. 4, 2022

(54) DATA STORAGE METHOD, STORAGE SERVER, AND STORAGE MEDIUM AND SYSTEM

(71) Applicant: HANGZHOU HIKVISION DIGITAL TECHNOLOGY CO., LTD.

(72) Inventors: Yingxue Long, Zhejiang (CN); Wei Wang, Zhejiang (CN); Qiqian Lin, Zhejiang (CN); Weichun Wang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 100 days.

(21) Appl. No.: 16/616,443

(22) PCT Filed: May 22, 2018

(86) PCT No.: PCT/CN2018/087912
§ 371 (c)(1),
(2) Date: Nov. 22, 2019

(87) PCT Pub. No.: WO2018/214887
PCT Pub. Date: Nov. 29, 2018

(65) Prior Publication Data
US 2020/0145489 A1    May 7, 2020

(30) Foreign Application Priority Data
May 23, 2017 (CN) .......................... 201710369637.1

(51) Int. Cl.
*H04L 29/08* (2006.01)
*H04L 12/26* (2006.01)

(52) U.S. Cl.
CPC ...... *H04L 67/1097* (2013.01); *H04L 43/0829* (2013.01); *H04L 43/0847* (2013.01)

(58) Field of Classification Search
CPC ............. H04L 67/1097; H04L 43/0829; H04L 43/0847; H04L 43/0811; H04L 41/0622;
(Continued)

(56) References Cited

U.S. PATENT DOCUMENTS 10,917,471 B1 *   2/2021   Karumbunathan ..... G06F 3/065
2009/0313330 A1   12/2009  Sakamoto
(Continued)

FOREIGN PATENT DOCUMENTS

CN      102255974       11/2011
CN      102255974 A  *  11/2011
(Continued)

OTHER PUBLICATIONS

First office action with translation for Chinese application No. 201710369637.1 dated Dec. 20, 2019.
(Continued)

*Primary Examiner* — Umar Cheema
*Assistant Examiner* — James Ross Hollister
(74) *Attorney, Agent, or Firm* — Knobbe, Martens, Olson & Bear, LLP (57) ABSTRACT

The present disclosure provides a data storage method, belonging to the field of data processing. The method is applied to a storage server in a cloud storage system. The method includes: monitoring data transmission status of a data acquisition device; obtaining data exception information according to the monitored data transmission exceptional status; transmitting a first data backhaul request to the data acquisition device, the data acquisition device being configured to return first data acquired within the exception time period upon receiving the first data backhaul request; and storing the first data upon receiving the first data.

9 Claims, 6 Drawing Sheets

(58) Field of Classification Search
CPC .............. H04L 29/08; H04N 21/23103; H04N 21/2405; H04N 21/23116
See application file for complete search history.

(56) References Cited

U.S. PATENT DOCUMENTS

| | | | |
|---|---|---|---|
| 2012/0087235 A1* | 4/2012 | Smith | H04L 43/14 |
| | | | 370/221 |
| 2013/0326355 A1 | 12/2013 | Pak et al. | |
| 2013/0347068 A1 | 12/2013 | Elleboe et al. | |
| 2014/0355439 A1* | 12/2014 | Kakadia | H04L 47/522 |
| | | | 370/235 |
| 2016/0331286 A1* | 11/2016 | Mensinger | G08B 21/0211 |
| 2018/0316762 A1* | 11/2018 | Matsumoto | H04L 43/08 |

FOREIGN PATENT DOCUMENTS

| | | |
|---|---|---|
| CN | 105490847 | 4/2016 |
| CN | 106375393 A | 2/2017 |

OTHER PUBLICATIONS

Extended European search report of counterpart EP application No. 18806912.4 dated Apr. 3, 2020.
Second office action with translation of Chinese application No. 201710369637.1 dated May 28, 2020.
International Search Report and Written Opinion in PCT Application PCT/CN2018/087912 dated Aug. 10, 2018 in 8 pages.

* cited by examiner

DATA STORAGE METHOD, STORAGE SERVER, AND STORAGE MEDIUM AND SYSTEM

This application is a National Phase of International Application No. PCT/CN2018/087912, filed on May 22, 2018 and entitled "DATA STORAGE METHOD, STORAGE SERVER AND SYSTEM", which claims priority to Chinese Patent Application No. 201710369637.1, filed on May 23, 2017 and entitled "DATA STORAGE METHOD, STORAGE SERVER, AND STORAGE MEDIUM AND SYSTEM", each of which is hereby incorporated by reference in their entirety.

TECHNICAL FIELD

The present disclosure relates to the field of data processing, and more particularly, relates to a data storage method, a storage server, and a storage medium and system.

BACKGROUND

The cloud storage technology refers to the technology integrating a large number of storage servers in a network via application software by means of functions such as a cluster application, the network technology or a distributed file system to jointly provide data storage and data access functions. Upon acquiring data, a data acquisition device at a front end may store the data in a storage server by the cloud storage technology, thereby providing an effective assurance for long-term storage of the data, and enabling users to connect any terminal to the storage server anytime and anywhere for conveniently accessing the data.

SUMMARY

Embodiments of the present disclosure provide a data storage method, a storage server, and a storage medium and system. The technical solutions are as follows.

In one aspect, a data storage method is provided. The method is applied to a storage server in a cloud storage system. The method includes:

monitoring data transmission status of a data acquisition device, the data acquisition device being configured to transmit acquired data to the storage server;

obtaining data exception information according to the monitored data transmission exceptional status, the data exception information including exception start time and exception end time, the exception start time and the exception end time being used to determine an exception time period;

transmitting a first data backhaul request to the data acquisition device, the first data backhaul request including the data exception information, the data acquisition device being configured to return first data acquired within the exception time period upon receiving the first data backhaul request; and storing the first data upon receiving the first data.

In a possible implementation, the monitoring data transmission status of a data acquisition device includes at least one of:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

In another possible implementation, the obtaining data exception information according to the monitored data transmission exceptional status includes:

generating data exception information when monitoring that the data transmission status of the data acquisition device is exceptional, the data exception information including the exception start time;

adding the exception end time into the data exception information when monitoring that the data transmission status of the data acquisition device resumes to normal.

In another possible implementation, the cloud storage system further includes a management server, and the method further includes:

receiving a first data storage task delivered by the management server, the first data storage task including a designated data acquisition device identifier and a first time period; and storing, based on the first data storage task, data transmitted by a designated data acquisition device within the first time period.

In another possible implementation, upon the storing, based on the first data storage task, data transmitted by a designated data acquisition device within the first time period, the method further including:

transmitting a storage record to the management server, the storage record including the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not include a second time period within the first time period, the second data storage task including the designated data acquisition device identifier and the second time period;

transmitting a second data backhaul request to the designated data acquisition device upon receiving the second data storage task delivered by the management server, the second data backhaul request including the second time period, the designated data acquisition device being configured to return second data acquired within the second time period upon receiving the second data backhaul request; and storing the second data upon receiving the second data.

In another possible implementation, upon the storing, based on the first data storage task, data transmitted by a designated data acquisition device within the first time period, the method further includes:

comparing the storage record with the first data storage task, and transmitting a second data backhaul request to the designated data acquisition device when determining that the storage time period does not include the second time period within the first time period, the second data backhaul request including the second time period, the designated data acquisition device being configured to return second data acquired within the second time period upon receiving the second data backhaul request; and storing the second data upon receiving the second data.

In another aspect, a storage server is provided. The storage server is applied to a storage server in a cloud storage system. The storage server includes:

a monitoring module, configured to monitor data transmission status of a data acquisition device, the data acquisition device being configured to transmit acquired data to the storage server;

wherein the monitoring module is further configured to obtain data exception information according to the monitored data transmission exceptional status, the data exception information including exception start time and exception end time, the exception start time and the exception end time being used to determine an exception time period;

a backhaul executing module, configured to transmit a first data backhaul request to the data acquisition device, the first data backhaul request including the data exception information, the data acquisition device being configured to return first data acquired within the exception time period upon receiving the first data backhaul request; and a storing module, configured to store the first data upon receiving the first data.

In another possible implementation, the monitoring module is further configured to perform at least one of the following steps:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

In another possible implementation, the monitoring module is further configured to generate data exception information when monitoring that the data transmission status of the data acquisition device is exceptional, the data exception information including the exception start time; and the monitoring module is further configured to add the exception end time into the data exception information when monitoring that the data transmission status of the data acquisition device resumes to normal.

In another possible implementation, the cloud storage system further includes a management server, and the storage server further includes:

a receiving module, configured to receive a first data storage task delivered by the management server, the first data storage task including a designated data acquisition device identifier and a first time period; wherein the storing module is configured to store data transmitted by the designated data acquisition device within the first time period based on the first data storage task.

In another possible implementation, the storage server further includes:

a transmitting module, configured to transmit a storage record to the management server, the storage record including the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not include a second time period within the first time period, the second data storage task including the designated data acquisition device identifier and the second time period; wherein the backhaul executing module is configured to transmit a second data backhaul request to the designated data acquisition device upon receiving the second data storage task delivered by the management server, the second data backhaul request including the second time period, the designated data acquisition device being configured to return second data acquired within the second time period upon receiving the second data backhaul request; and the storing module is configured to store the second data upon receiving the second data.

In another possible implementation, the storage server further includes:

an integrity comparing module, configured to compare the storage record with the first data storage task; wherein the backhaul executing module is further configured to transmit a second data backhaul request to the designated data acquisition device when determining that the storage time period does not include the second time period within the first time period, the second data backhaul request including the second time period, the designated data acquisition device being configured to return second data acquired within the second time period upon receiving the second data backhaul request; and the storing module is further configured to store the second data upon receiving the second data.

In another aspect, a storage server is provided. The storage server includes a processor and a memory, wherein at least one instruction is stored in the memory stores and loaded and executed by the processor to perform the following operations:

monitoring data transmission status of a data acquisition device, the data acquisition device being configured to transmit acquired data to the storage server;

obtaining data exception information according to the monitored data transmission exceptional status, the data exception information including exception start time and exception end time, the exception start time and the exception end time being used to determine an exception time period;

transmitting a first data backhaul request to the data acquisition device, the first data backhaul request including the data exception information, the data acquisition device being configured to return first data acquired within the exception time period upon receiving the first data backhaul request; and storing the first data upon receiving the first data.

In another possible implementation, the at least one instructions is loaded and executed by the processor to perform at least one of the following operations:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

In another possible implementation, the at least one instruction is loaded and executed by the processor to perform the following operations:

generating data exception information when monitoring that the data transmission status of the data acquisition device is exceptional, the data exception information including the exception start time; and adding the exception end time into the data exception information when monitoring that the data transmission status of the data acquisition device resumes to normal.

In another possible implementation, the at least one instruction is loaded and executed by the processor to perform the following operations:

receiving a first data storage task delivered by the management server, the first data storage task including a designated data acquisition device identifier and a first time period; and storing data transmitted by a designated data acquisition device within the first time period based on the first data storage task.

In another possible implementation, the at least one instruction is loaded and executed by the processor to perform the following operations:

transmitting a storage record to the management server, the storage record including the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not include a second time period within the first time period, the second data storage task including the designated data acquisition device identifier and the second time period;

transmitting a second data backhaul request to the designated data acquisition device upon receiving the second data storage task delivered by the management server, the second data backhaul request including the second time period, the designated data acquisition device being configured to return second data acquired within the second time period upon receiving the second data backhaul request; and storing the second data upon receiving the second data.

In another possible implementation, the at least one instruction is loaded and executed by the processor to perform the following operations:

comparing the storage record with the first data storage task, and transmitting a second data backhaul request to the designated data acquisition device when determining that the storage time period does not include the second time period within the first time period, the second data backhaul request including the second time period, the designated data acquisition device being configured to return second data acquired within the second time period upon receiving the second data backhaul request; and storing the second data upon receiving the second data.

In another aspect, a computer-readable storage medium is provided. At least one instruction is stored in the computer-readable storage medium and loaded and executed by a processor to perform the operations in the method according to the above aspect.

In another aspect, a cloud storage system is provided. The system includes a storage server; wherein the storage server is configured to perform the method according to the above aspect.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may also derive other drawings and description and fall within the scope of the disclosure herein.

DETAILED DESCRIPTION

The technical solutions in embodiments of the present disclosure are clearly and completely described hereinafter with reference to accompanying drawings of the embodiments of the present disclosure. It is apparent that the described embodiments are a part of the embodiments of the present disclosure, but not all the embodiments. All other embodiments obtained by those skilled in the art based on the embodiments of the present disclosure fall within the scope of the present disclosure.

Figure 1:
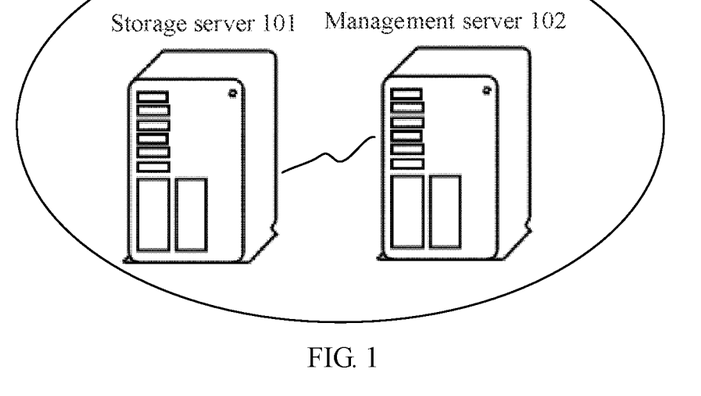
FIG. 1 is a schematic structural diagram of a cloud storage system according to an embodiment of the present disclosure.

Embodiments of the present disclosure provide a cloud storage system. The cloud storage system includes a storage server 101, configured to store data acquired by a data acquisition device.

In one possible implementation, the cloud storage system may include a plurality of storage servers 101, which are configured to store data acquired by the data acquisition device.

In another possible implementation, with reference to FIG. 1, the cloud storage system may further include a management server 102, which may be configured to manage data storage of the storage server 101, for example, managing the data acquisition device of transmitting data to the storage server 101, and storing a time period during which the storage server 101 stores the data.

In a case where the cloud storage system includes the plurality of storage servers 101, the management server 102 may be a server independent of the plurality of storage servers 101, and the management server 102 is connected to the plurality of storage servers 101 via a network to manage the plurality of storage servers 101.

Alternatively, the management server 102 may be one storage server 101 of the plurality of storage servers 101 and may be connected to the other storage servers 101 of the plurality of storage servers 101 over a network. The management server 102 has the functions of both storage and management. That is, the management server 102 may serve as the storage server 101 to store data, or may serve as the management server 102 to manage the plurality of storage servers 101. The management server 102 may be selected from the plurality of storage servers 101. For example, the management server 102 may be a server randomly selected from the plurality of storage servers 101, or may be the storage server 101 with a powerful processing capability among the plurality of storage servers 101. Moreover, in an actual application process, when the current management server 102 fails to operate normally since an exception occurs therein, one management server 102 may be re-selected from the remaining storage servers 101.

Figure 2:
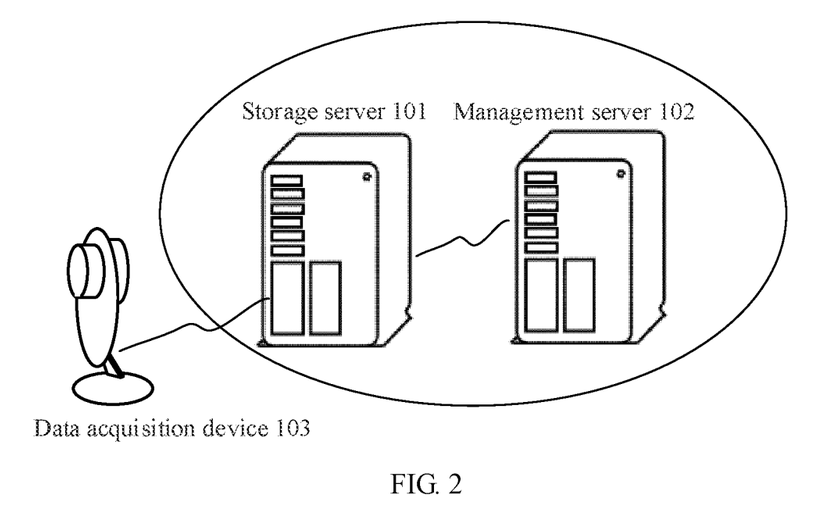
FIG. 2 is a schematic diagram of an implementation environment according to an embodiment of the present disclosure.

Embodiments of the present disclosure further provide an implementation environment. FIG. 2 is a schematic diagram of an implementation environment according to an embodiment of the present disclosure. The implementation environment includes a cloud storage system and a data acquisition device 103, wherein the data acquisition device 103 is connected to the cloud storage systems over a network.

The data acquisition device 103 is configured to acquire various types of data, such as video data, audio data, and the like. The data acquisition device 103 may be an Internet Protocol camera (IPC), an network video recorder (NVR), a digital video recorder (DVR), or the like. After the data acquisition device 103 acquires the data, the acquired data is transmitted the storage server 101 in the cloud storage system. The storage server 101 is configured to store the data acquired by the data acquisition device 103 for a user to query or download.

Figure 3:
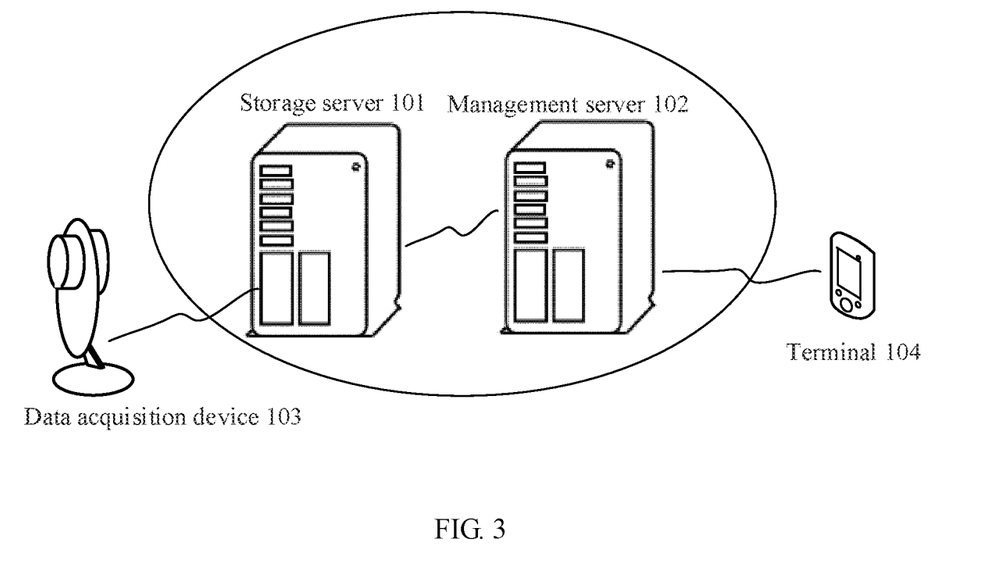
FIG. 3 is a schematic diagram of another implementation environment according to an embodiment of the present disclosure.

In one possible implementation, FIG. 3 is a schematic diagram of another implementation environment according to an embodiment of the present disclosure. The implementation environment includes a cloud storage system, a data acquisition device 103 and a terminal 104. With reference to FIG. 3, the terminal 104 is connected to the management server 102 via a network, may deliver a data acquisition task to the storage server 101 by the management server 102, or may access the storage server 101 by the management server 102 for performing management operations such as querying, downloading and modifying on the data stored in the storage server 101.

The embodiment of the present disclosure may be applied to various scenarios for acquiring data. For example, an IPC is disposed in a certain place, video monitoring is performed by the IPC, and the acquired video data is stored in the cloud storage system. Moreover, a video monitoring task may be delivered to the IPC via a terminal, and the operations such as querying, downloading and modifying are performed on the monitored video data.

Figure 4:
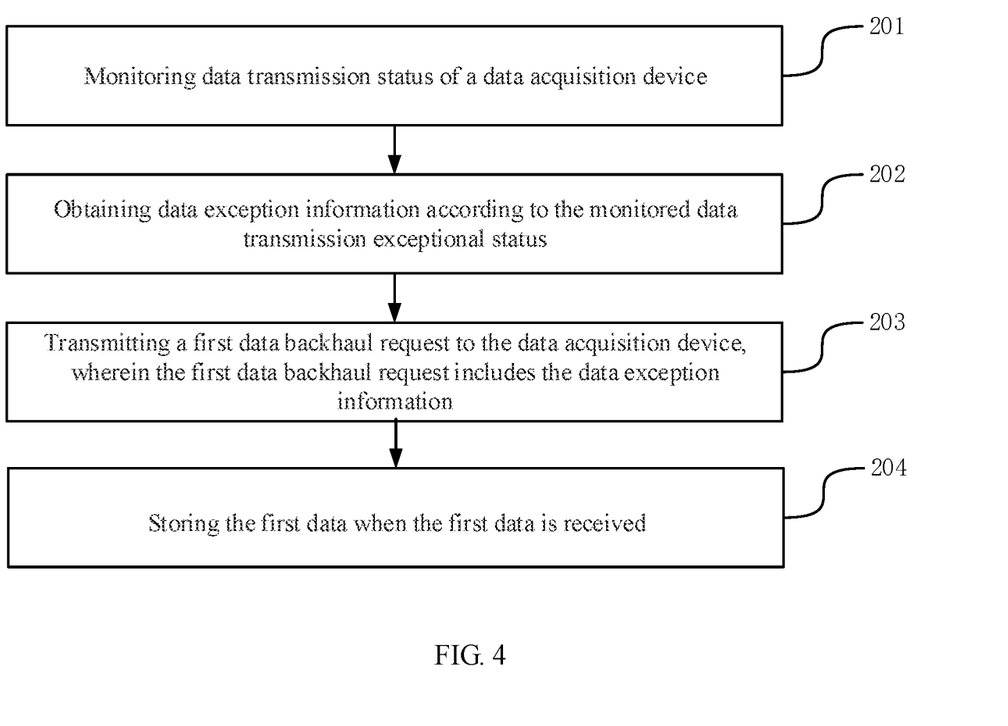
FIG. 4 is a flowchart of a data storage method according to an embodiment of the present disclosure.

FIG. 4 is a flowchart of a data storage method according to an embodiment of the present disclosure. An execution subject in the embodiment of the present disclosure is a storage server in the cloud storage system shown in the above embodiment. With reference to FIG. 4, the method includes the following steps.

In 201, data transmission status of a data acquisition device is monitored, wherein the data acquisition device is configured to transmit acquired data to the storage server.

In 202, data exception information is obtained according to the monitored data transmission exceptional status, wherein the data exception information includes exception start time and exception end time, and the exception start time and the exception end time are used to determine an exception time period.

In 203, a first data backhaul request is transmitted to the data acquisition device, wherein the first data backhaul request includes the data exception information, and the data acquisition device is configured to return first data acquired within the exception time period upon receiving the first data backhaul request.

In 204, when the first data is received, the first data is stored.

In related art, the data acquisition devices are relatively dispersedly distributed, which are easily affected by factors such as network environments and the like. When the data acquisition device fails to transmit the data to the storage server, the acquired data may only be stored in the data acquisition device rather than being stored in the storage server. As a result, the data stored in the storage server is incomplete, and thus reliability of the data may not be ensured.

The method according to the embodiments of the present disclosure can punctually monitor an exception occurring in a process of transmitting data to the storage server by the data acquisition device by monitoring the data transmission status of the data acquisition device in real time, determine the exception time period, store, in the storage server, the data acquired in the exception time period by the data acquisition device. In this way, the lost data is complemented by data backhaul, the integrity and reliability of the data are ensured, and excellent instantaneity is achieved.

Figure 5:
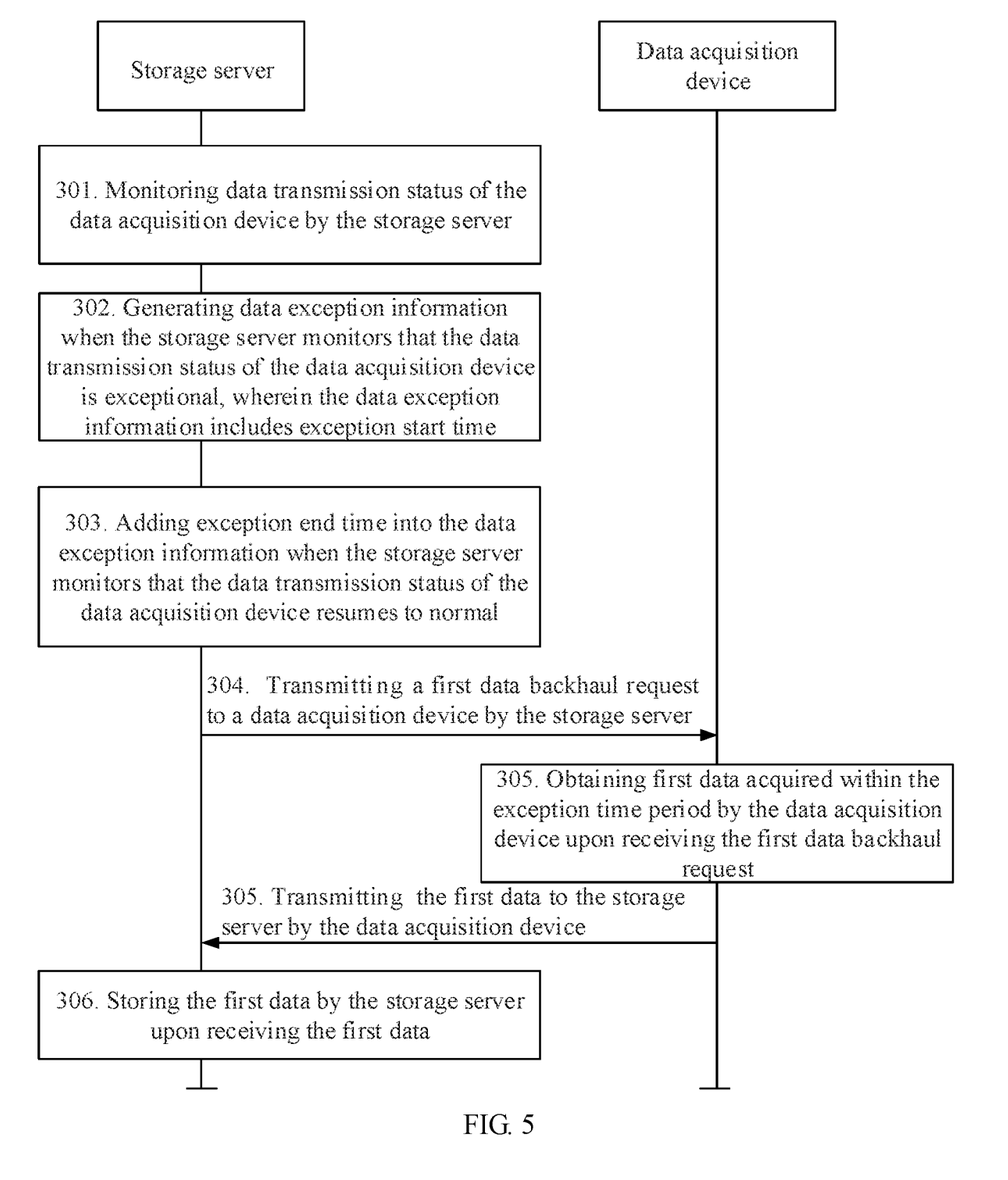
FIG. 5 is a flowchart of a data storage method according to another embodiment of the present disclosure.

FIG. 5 is a flowchart of a data storage method according to an embodiment of the present disclosure. An interaction subject in the embodiment of the present disclosure is a data acquisition device as well as a storage server in the cloud storage system shown in the above embodiment. With reference to FIG. 5, the method includes the following steps.

In 301, the storage server monitors data transmission status of the data acquisition device.

In a process of acquiring the data by the data acquisition device, the acquired data may be transmitted to the storage server, and at this time, the storage server may receive and store the data. The data may include audio data, video data, image data, and the like.

In the embodiment of the present disclosure, in order to prevent data loss caused by an exception occurring in a process of transmitting the data to the storage server by the data acquisition device, the storage server may monitor the data transmission status of the data acquisition device, so as to find the exception punctually.

From different perspectives, the data transmission status of the data acquisition device may be expressed in different forms. For example, the data transmission status of the data acquisition device may include status of a data link between the storage server and the data acquisition device, the transmitted data itself, or information indicating whether the transmitted data may be written to the storage server or not. Accordingly, the storage server may monitor the data transmission status from different perspectives. For example, the step 301 may include at least one of the following embodiments.

In one embodiment, whether a data link between the storage server and the data acquisition device is normal or not is monitored.

In 3011, whether a data link between the storage server and the data acquisition device is normal or not is monitored.

The normal data link means that the data may be successfully transmitted through the data link, and the exceptional data link may include multiple cases. For example, the data link is disconnected, the data link has a too low data transmission speed, and the data link is interfered by other links.

The data is transmitted between the storage server and the data acquisition device through the data link. If the data link is exceptional, the storage server may not successfully receive the data transmitted by the data acquisition device. Therefore, in order to punctually monitor the above cases, the storage server may monitor whether the data link is normal or not in a data transmission process.

Once it is monitored that the data link is exceptional, it indicates that the storage server will not receive the data transmitted by the data acquisition device, and the data acquisition device is expected to return the data. If it is monitored that the data link is normal, it indicates that the storage server may receive the data transmitted by the data acquisition device, and the data acquisition device is not expected to return the data.

In another embodiment, whether data transmitted by the data acquisition device is normal or not is monitored.

The exception in the data transmitted by the data acquisition device may include a plurality of cases. For example, the data is incomplete since a part of the data is lost, the data is corrupted, or a format of the data does not conform to a format determined by negotiation of the data acquisition device and the storage server.

In the data transmission process, data loss or data corruption may be caused due to various reasons. That is, even if the storage server receives the data transmitted by the data acquisition device, the data may not be complete data or the data may have been damaged, that is, the data has expired.

Therefore, in order to punctually monitor the occurrence of the above cases, upon receiving the data, the storage server may not store the data, but monitor whether the data is normal. When the storage server monitors that the data is exceptional, it indicates that the data received by the storage server is invalid data, and the data acquisition device is expected to re-upload valid data. If the storage server monitors that the data is normal, it indicates that the data received by the storage server is the valid data, and the data is stored.

When whether the data is normal or not is monitored, whether the format of the data is a preset format may be determined, and the preset format may be a format matching with the data acquisition device. For example, the data transmitted by the IPC should be in a video format. When it is determined that the data transmitted by the IPC only includes the audio data, it indicates that the video data is lost.

When the format of the data is determined, a data type identifier carried in a packet header of a data packet may be obtained, and the format of the data is determined according to the data type identifier.

In another embodiment, whether the data transmitted by the data acquisition device is normally written to the storage server or not is monitored.

Upon receiving the data, the storage server writes the data into a database, but the data may not be successfully written due to a misoperation or a failure of the storage server. That is, the storage server may not successfully store the data.

Therefore, in order to punctually monitor the occurrence of the above cases, after writing the data, the storage server may monitor whether the data is normally written or not. When it is determined that the data is not normally written, it indicates that the data fails to be stored, and then the data acquisition device is expected to re-upload the data. When it is determined that the data is normally written, it indicates that the data is successfully stored, and then the data acquisition device is expected to re-upload the data.

For example, when the storage server performs an operation of writing the data and receives an operation result of successfully writing the data, it is determined that the data is normally written. However, when the storage server performs an operation of writing the data, but receives an operation result indicative of a failure to write the data, it is determined that the data is not written normally.

In 302, data exception information is generated when the storage server monitors that the data transmission status of the data acquisition device is exceptional, wherein the data exception information includes exception start time.

In 303, exception end time is added into the data exception information when the storage server monitors that the data transmission status of the data acquisition device resumes to normal.

In the embodiment of the present disclosure, the storage server may obtain the data exception information according to the monitored data transmission exceptional status, wherein the data exception information includes the exception start time and the exception end time, and the exception start time and the exception end time are used to determine an exception time period, such that the data within the exception time period may be restored according to the data exception information after the data transmission status resumes to normal.

In fact, when the storage server monitors that the data transmission status is exceptional, a time point, that is, the exception start time, at which an exception starts to occur is obtained, and the data exception information including the exception start time is generated. Then, whether the data transmission status is normal or not is continuously monitored until the data transmission status resumes to normal; and time, that is, the exception end time, at which the data transmission status resumes to normal is obtained. At this time, the exception end time is added into the data exception information, and a time period determined by the exception start time and the exception time period is the exception time period.

Based on the above-described embodiments, a process in which the storage server monitors that the data transmission status resumes to normal may include at least one of the following embodiments.

In one embodiment, when it is monitored that the data link between the storage server and the data acquisition device resumes to normal, and the data transmitted by the data acquisition device may be normally received, it is determined that the data transmission status resumes to normal.

In another embodiment, when it is monitored that the data transmitted by the data acquisition device is normal data, it is determined that the data transmission status resumes to normal.

In another embodiment, when it is monitored that the data transmitted by the data acquisition device may be normally written into the storage server, it is determined that the data transmission status resumes to normal.

In addition, the data exception information includes not only the exception start time and the exception end time, but also an exceptional cause, an exception case description, and the like. Alternatively, in order to distinguish different data acquisition devices, the data exception information may include a device identifier of the data acquisition device that is exceptional; and the device identifier is used to uniquely determine the corresponding data acquisition device, and may be address information or a device number of the data acquisition device.

Figure 6:
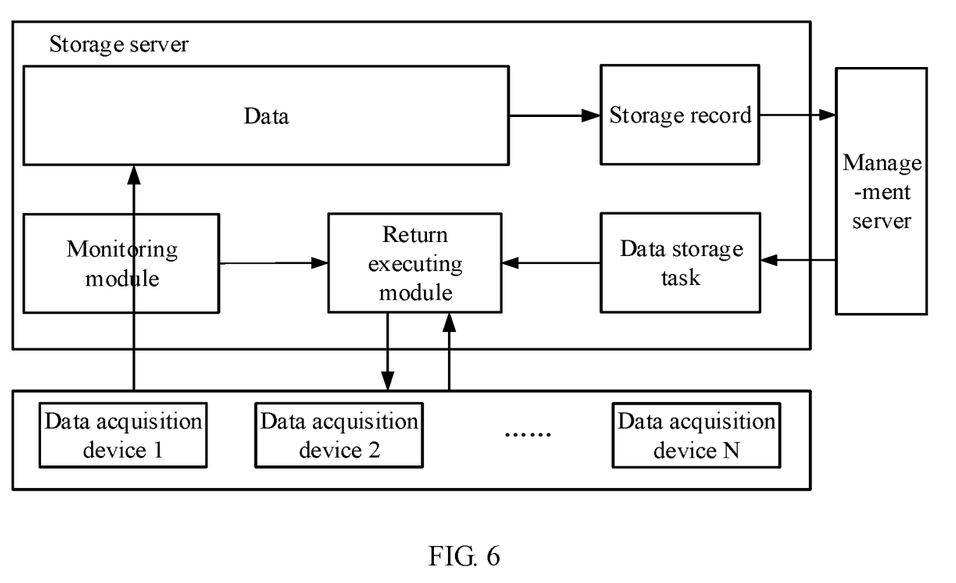
FIG. 6 is a schematic structural diagram of a storage server according to an embodiment of the present disclosure.

FIG. 6 is a schematic structural diagram of a storage server according to an embodiment of the present disclosure. With reference to FIG. 6, the storage server may include a monitoring module, which may perform the above steps 301 to 303 to monitor data transmission status and generate data exception information when monitoring an exception.

In 304, the storage server transmits a first data backhaul request to a data acquisition device, wherein the first data backhaul request includes the data exception information.

With reference to FIG. 6, the storage server may further include a backhaul executing module. After obtaining the data exception information, the monitoring module may generate a data backhaul task, and transmit the data backhaul task to the backhaul executing module, wherein the data backhaul task may include the data exception information, at this time, the backhaul executing module executes the step 304 based on the data backhaul task, so as to return data within an exception time period to the storage server.

It should be noted that the step 304 is performed after the above step 303. For example, after the storage server determines that the data transmission status resumes to normal and the exception end time is added into the data exception information, the step 304 may be immediately performed, so as to improve the data complementing speed.

In 305, the data acquisition device obtains first data acquired within the exception time period and transmits the first data to the storage server upon receiving the first data backhaul request.

The first data backhaul information is used to request the data acquisition device to re-upload the data acquired within the exception time period.

Each time the data acquisition device acquires the data, the data may be cached. Then, within the exception time period, although the storage server obtains no normal data, the data acquisition device has cached the data. When the data transmission status resumes to normal and the storage server transmits the first data backhaul request to the data acquisition device, the data acquisition device may obtain the first data acquired within the exception time period from the cached data, and re-upload the first data to the storage server.

In order to ensure that the data within the exception time period may be returned, a duration in which the data is cached may be set to a preset duration each time the data acquisition device acquires the data, wherein it should be determined that the preset duration may be greater than the duration of the exception based on the duration in which the exception is generally lasted, so as to ensure that the data has not been deleted when the data transmission status resumes to normal. Afterwards, when the duration in which the data is cached exceeds the preset duration, the data may be deleted to avoid consuming storage resources of the data acquisition device.

Alternatively, the data acquisition device may not set the duration in which the data is cached. The data is cached into a database each time the data is acquired. When the storage capacity of the database becomes zero, if the data is acquired again, original data in the database is replaced with the currently acquired data.

In 306, upon receiving the first data, the storage server stores the first data.

Upon receiving the first data, the storage server re-stores the first data. When a storage rule used by the storage server is that the data is stored according to acquisition time, since the storage server may have stored the data uploaded by the data acquisition device before the exception time period and after the exception time period, upon receiving the first data, the storage server may store the first data after the data received before the exception time period and before the data received upon the exception time period, so as to ensure that the stored data may be arranged according to actual acquisition time.

It should be noted that the embodiment of the present disclosure is exemplarily described only as one storage server and one data acquisition device. However, in practice, for a plurality of storage servers and a plurality of data acquisition devices, monitoring the exception of the data transmission status and returning the data may be performed between any one storage server and any one data acquisition device by using the method according to the embodiment of the present disclosure.

With the method according to the embodiment of the present disclosure, the exception occurring in the process of transmitting the data to the storage server by the data acquisition device may be punctually monitored by monitoring the data transmission status of the data acquisition device, the exception time period may be determined, the data acquired in the exception time period by the data acquisition device may be stored in the storage server. In this way, the lost data is complemented by data backhaul, the integrity and reliability of the data are ensured, and excellent instantaneity is achieved. Moreover, compared with the data acquisition device, the storage server has a larger storage capacity and a stronger data processing capability, and thus ensures persistency of the data since the data is stored in the storage server.

Figure 8:
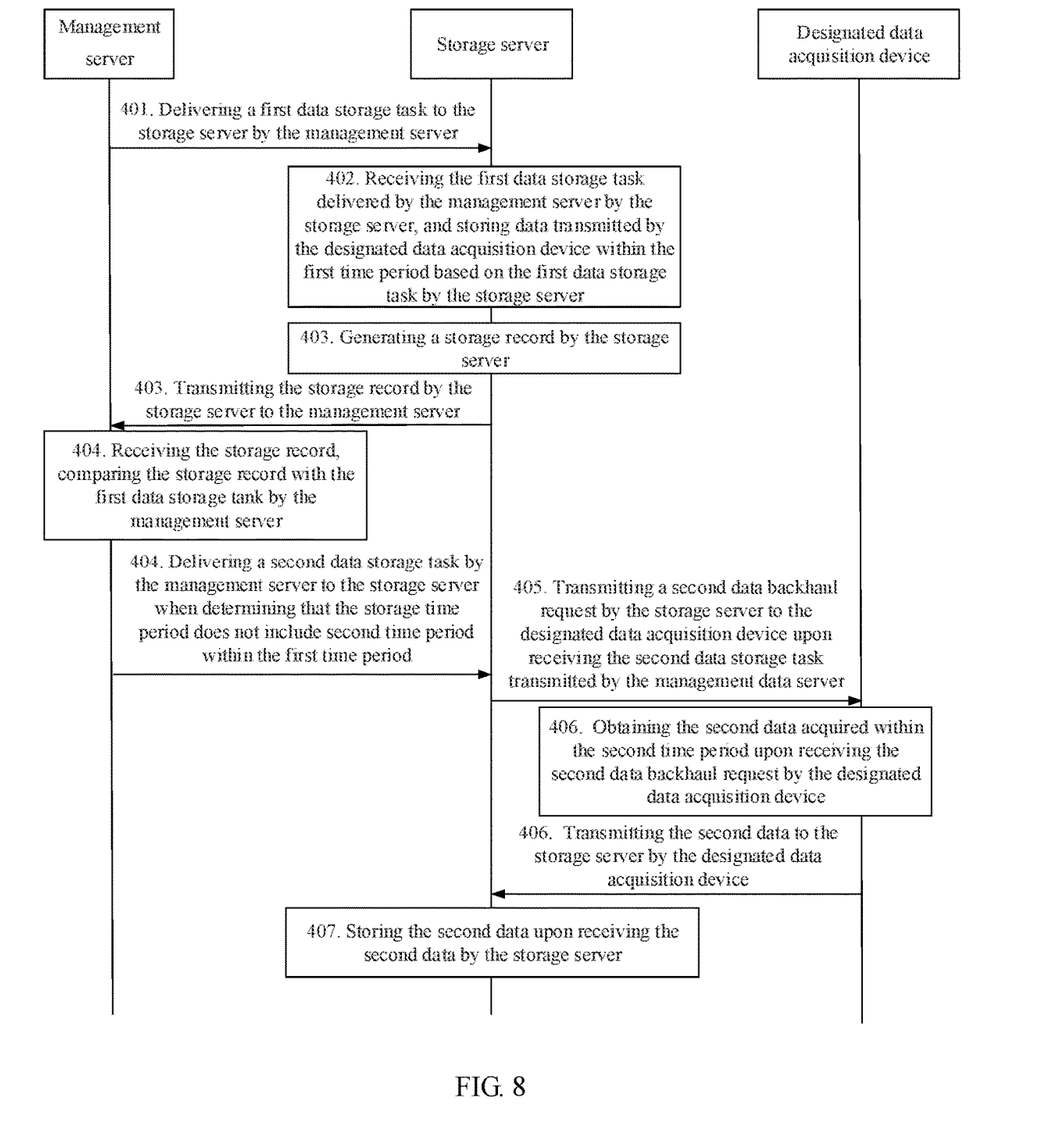
FIG. 8 is a flowchart of a data storage method according to another embodiment of the present disclosure.

On the basis of the above embodiments, embodiments of the present disclosure further provide a data storage method. FIG. 8 is a flowchart of a data storage method according to an embodiment of the present disclosure. An interaction subject in the embodiment of the present disclosure is a storage server in a cloud storage system, as well as a management server, a terminal, and a designated data acquisition device. With reference to FIG. 8, the method includes the following steps.

In 401, the management server delivers a first data storage task to the storage server.

Since the cloud storage system may include a plurality of storage servers and a plurality of data acquisition devices. For orderly management of data storage, the data storage may be controlled by the management server.

In the embodiment of the present disclosure, the management server may obtain the first data storage task, wherein the first data storage task includes a designated data acquisition device identifier and a first time period, and indicates that data acquired by the designated data acquisition device within the first time period is stored. Afterwards, the management server delivers the first data storage task to the storage server, and the storage server performs data storage based on the first data storage task.

The data acquisition device identifier is used to determine a unique corresponding data acquisition device, and may be a device number, an Internet Protocol (IP) address, or the like of the data acquisition device. The data storage task may be generated by the management server, or may be delivered to the management server after being generated by the terminal connected to the management server. The terminal may be a computer, a mobile phone, or other types of devices.

In practice, the control personnel may determine the designated data acquisition device and the first time period on the terminal. The terminal generates a first data storage task and then uploads the first data storage task to the management server. The management server may determine the storage server which should perform the first data storage tank, and deliver the first data storage task to the determined storage server.

The first time period may be determined according to a monitoring requirement of the designated data acquisition device. For example, for the IPC, the IPC monitors a designated place, and the first time period may be determined according to a monitoring requirement of the designated place, in order to obtain video data of the designated place within the first time period without obtaining video data of the designated place in other time periods. For a hospital, only video data of the hospital during working hours is monitored, and there is no need to monitor video data of the hospital during rest periods.

In 402, the storage server receives the first data storage task delivered by the management server, and stores data transmitted by the designated data acquisition device within the first time period based on the first data storage task.

In the embodiment of the present disclosure, based on the first data storage task, it is necessary for the storage server to store the data transmitted by the designated data acquisition device within the first time period, but unnecessary for the storage server to store the data transmitted by the designated data acquisition device within other time periods. Therefore, within the first time period, when the storage server receives the data transmitted by the designated data acquisition device, the data may be stored. Within other time periods, when the storage server receives the data transmitted by the designated data acquisition device, the data may not be stored.

In 403, the storage server generates a storage record, and transmits the storage record to the management server.

After the storage server stores the data transmitted by the designated data acquisition device, the storage record may be generated, wherein the storage record includes the designated data acquisition device identifier and a corresponding storage time period. The storage period is a time period during which the data transmitted by the designated data acquisition device has been stored.

In the data storage process, data may be lost since an exception occurs in a communication link between the designated data acquisition device and the storage server or the storage server fails. In order to complement the lost data, the storage server may transmit the storage record to the management server, and the management server compares the time period during which the data needs to be stored with an actual storage time period.

The storage server may transmit the storage record to the management server after storing the data, or may transmit the storage record to the management server upon receiving a query request, which carries the designated data acquisition device identifier, transmitted by the management server. Accordingly, the step of performing the comparison by the management server may be performed periodically after the storage record is received, or may be performed at a preset time point or at any time point.

In 404, the management server receives the storage record, compares the storage record with the first data storage tank, and delivers a second data storage task to the storage server when determining that the storage time period does not include second time period within the first time period, wherein the second data storage task includes the designated data acquisition device identifier and the second time period.

In 405, the storage server transmits a second data backhaul request to the designated data acquisition device upon receiving the second data storage task transmitted by the management server.

The management server compares the storage record with the first data storage task, that is, comparing the storage time period with the first time period, and determining whether all the data within the first time period has been stored. When it is determined that the storage time period does not include the second time period within the first time period, indicating that the data within the second time period is lost, the management server delivers the second data storage task to the storage server, wherein the second data storage task includes the designated data acquisition device identifier and the second time period. The storage server transmits a second data backhaul request to the designated data acquisition device upon receiving the second data storage task, to request the designated data acquisition device to re-upload the data within the second time period.

With reference to FIG. 6, the management server transmits the second data storage task including the designated data acquisition device identifier and the second time period to the storage server when determining that the data within the second time period is lost, and transmits the second data storage task to the backhaul executing module, and at this time, the backhaul executing module transmits a second data backhaul request to the designated data acquisition device based on the second data storage task, so as to return the lost data to the storage server.

It should be noted that, the embodiment of the present disclosure will be exemplarily described as follows: after the storage server generates the storage record, the management server compares the storage record with the first data storage task. However, in another embodiment, the storage server may compare the storage record with the first data storage task. That is, the above steps 403 to 405 may be replaced with the following steps: the storage server generates the storage record, compares the storage record with the first data storage task, and transmits the second data backhaul request to the designated data acquisition device when determining that the storage time period does not include the second time period within the first time period.

Figure 7:
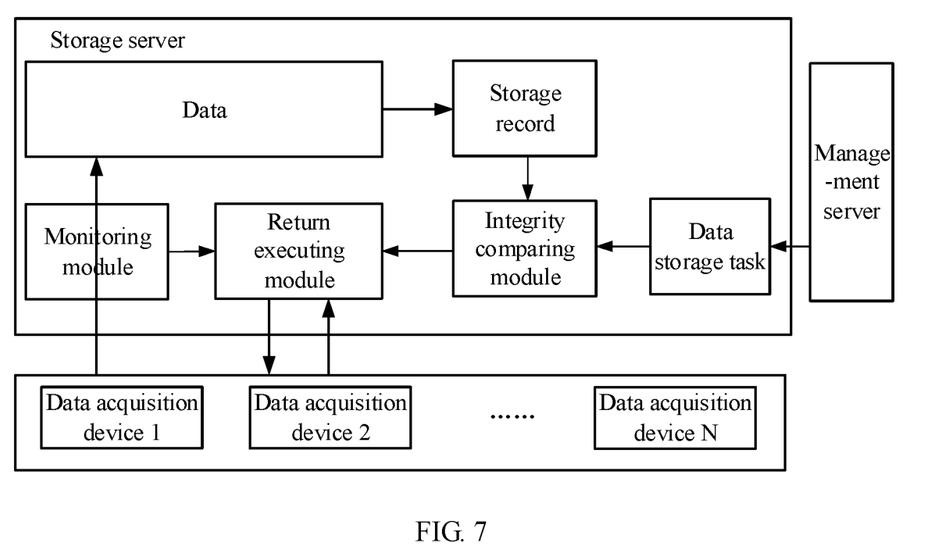
FIG. 7 is a schematic structural diagram of another storage server according to an embodiment of the present disclosure.

With reference to FIG. 7, the storage server may further include an integrity comparison module, which may perform the above comparison step, and generate a data backhaul task when comparing and determining that the data within the second time period is lost, and transmits the data backhaul task to the backhaul executing module, wherein the data backhaul task includes the second time period. At this time, the backhaul executing module transmits a second data backhaul request to the designated data acquisition device according to the data backhaul task, so as to return the lost data to the storage server by the designated data acquisition device.

In 406, the designated data acquisition device obtains the second data acquired within the second time period upon receiving the second data backhaul request, and transmits the second data to the storage server.

In 407, the storage server stores the second data upon receiving the second data.

For example, the first time period may include a third time period, a second time period and a fourth time period in a chronological order. The storage server has stored data within the third time period and the fourth time period, but not store data within the second time period. Subsequently, when the storage server receives the second data acquired within the second time period, the second data is stored after the data within the third time period and before the data within the fourth time period, so as to ensure that the stored data is arranged in the chronological order and the rationality is improved.

In addition, the terminal may query data in the storage server. For example, the terminal determines a data acquisition device identifier and a time period which are to be queried, and transmits a data query request to the management server. The management server transmits the data query request to the storage server, wherein the data query request carries the data acquisition device identifier and the time period. When the storage server receives the data query request, the storage server obtains the data acquired by the corresponding data acquisition device within the stored time period, the management server transmits the data to the terminal, and the terminal may present the data for a user to view.

Alternatively, the terminal may download the data stored in the storage server. For example, the terminal determines a data acquisition device identifier and a time period in which the data is to be downloaded, and transmits a data download request to the management server. The management server transmits the data download request to the storage server, wherein the data download request carries the data acquisition device identifier and the time period. The storage server obtains the data acquired by the corresponding data acquisition device within the stored time period upon receiving the data download request, the management server transmits the data to the terminal, and the terminal may download the data and store the data in the terminal.

With the method according to the embodiments of the present disclosure, the data loss may be punctually monitored immediately by comparing the storage record with the data storage task, and the second time period during which the data is lost may be determined, and the data acquired by the designated data acquisition device within the second time period may be stored in the data storage server. In this way, the lost data is complemented by data backhaul, the integrity and reliability of the data are ensured, and excellent instantaneity is achieved. Moreover, compared with the data acquisition device, the storage server has a larger storage capacity and a stronger data processing capability, and thus ensures persistency of the data since the data is stored in the storage server.

Based on the above embodiments shown in FIG. 5 and FIG. 8, the embodiments of the present disclosure provide a complete data integrity detection solution, which combines two methods of instant processing and timing processing, such that the integrity of the data may be ensured. After the data transmission status between the data acquisition device at a current end and the storage server is exceptional or the data is lost, the data may be complemented automatically.

Figure 9:
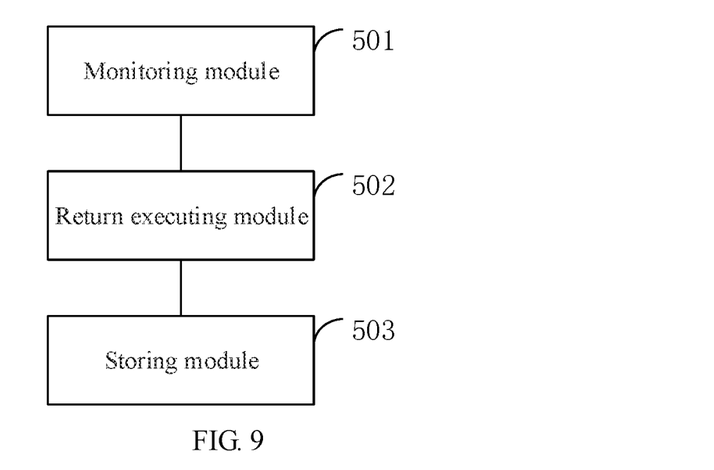
FIG. 9 is a schematic structural diagram of a storage server according to another embodiment of the present disclosure.

FIG. 9 is a schematic structural diagram of a storage server according to an embodiment of the present disclosure. With reference to FIG. 9, the storage server includes:

a monitoring module 501, configured to monitor data transmission status of a data acquisition device, the data acquisition device being configured to transmit acquired data to the storage server;

wherein the monitoring module 501 is further configured to obtain data exception information according to the monitored data transmission exceptional status, the data exception information including exception start time and exception end time, the exception start time and the exception end time being used to determine an exception time period;

a backhaul executing module 502, configured to transmit a first data backhaul request to the data acquisition device, the first data backhaul request including the data exception information, the data acquisition device being configured to return first data acquired within the exception time period upon receiving the first data backhaul request; and a storing module 503, configured to store the first data upon receiving the first data.

In one possible implementation, the monitoring module 501 is further configured to perform at least one of the following steps:

monitoring whether a data link between the storage server and the data acquisition device is normal or not;

monitoring whether data transmitted by the data acquisition device is normal or not; and monitoring whether the data transmitted by the data acquisition device is normally written to the storage server or not.

In another possible implementation, the monitoring module 501 is further configured to generate data exception information when monitoring that the data transmission status of the data acquisition device is exceptional, wherein the data exception information includes the exception start time; and the monitoring module 501 is further configured to add the exception end time into the data exception information when monitoring that the data transmission status of the data acquisition device resumes to normal.

In another possible implementation, the cloud storage system further includes a management server, and the storage server further includes:

a receiving module, configured to receive a first data storage task delivered by the management server, the first data storage task including a designated data acquisition device identifier and a first time period;

wherein the storing module 503 is configured to store data transmitted by the designated data acquisition device within the first time period based on the first data storage task;

a transmitting module, configured to transmit a storage record to the management server, the storage record including the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not include second time period within the first time period, the second data storage task including the designated data acquisition device identifier and the second time period; wherein the backhaul executing module 502 is configured to transmit a second data backhaul request to the designated data acquisition device upon receiving the second data storage task delivered by the management server, the second data backhaul request including the second time period, the designated data acquisition device being configured to return second data acquired within the second time period upon receiving the second data backhaul request; and the storing module 503 is configured to store the second data upon receiving the second data.

In another possible implementation, the storage server further includes:

an integrity comparison module, configured to compare the storage record with the first data storage task; wherein the backhaul executing module 502 is further configured to transmit a second data backhaul request to the designated data acquisition device when determining that the storage time period does not include the second time period within the first time period, the second data backhaul request including the second time period, the designated data acquisition device being configured to return second data acquired within the second time period upon receiving the second data backhaul request; and the storing module 503 is further configured to store the second data upon receiving the second data.

All of the above alternative technical solutions may be combined to form alternate embodiments of the present disclosure, which will be omitted here.

It should be noted that during data storage by the storage server according to this embodiment, description is given only using division of all the functional modules as an example. In practice, the above functions may be implemented by the different functional modules as required. That is, the internal structure of the storage server is divided into different functional modules to implement all or part of the functions described above. In addition, the storage server according to this embodiment is based on the same inventive concept as the data storage method according to the above embodiment. For the specific implementation of the storage server, reference may be made to the method embodiment, which is thus not described herein any further.

Figure 10:
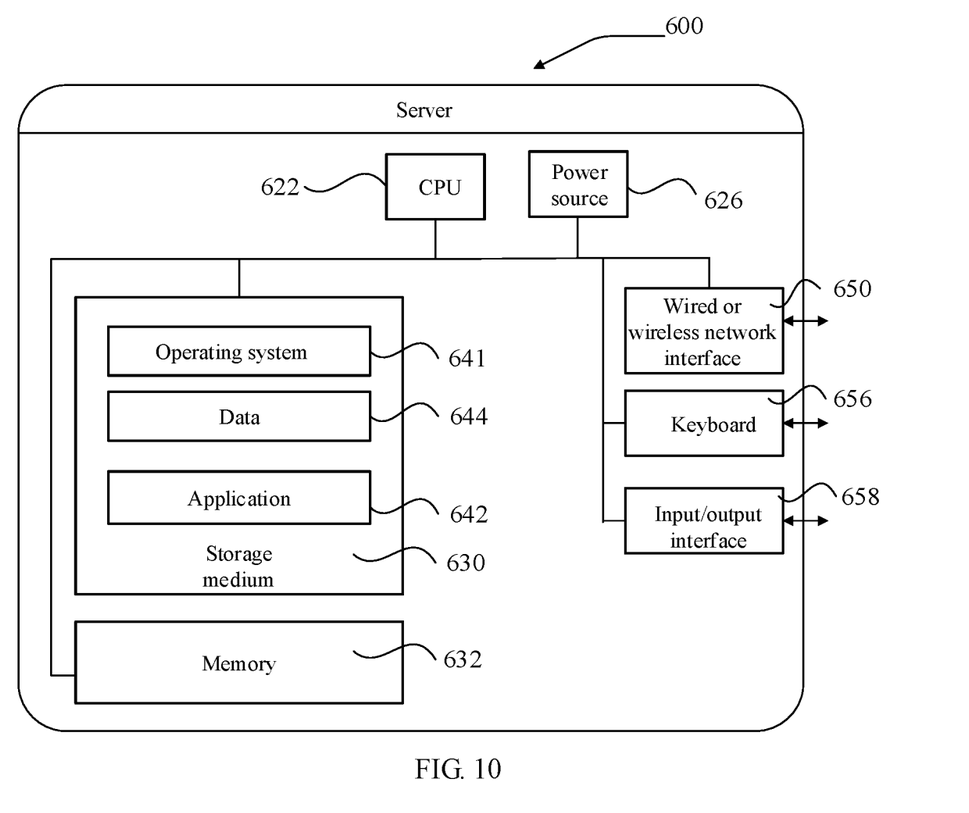
FIG. 10 is a schematic structural diagram of a storage server according to another embodiment of the present disclosure.

FIG. 10 is a schematic structural diagram of a storage server according to an embodiment of the present disclosure. The storage server 600 may vary greatly depending on different configurations or performance, and may include one or more central processing units (CPUs) 622 (e.g., one or more processors) and a memory 632, one or more storage media 630 (e.g., one or one mass storage devices) for storing an application 642 or data 644. The memory 632 and the storage medium 630 may be a transitory storage medium or a non-transitory storage media. The program stored in the storage medium 630 may include one or more modules (not shown in FIG. 6). Each of the one or more modules may include a series of operation instructions executable by the server. Furthermore, the CPU 622 may be communicated with the storage medium 630, and the series of operation instructions in the storage medium 630 may be executed on the storage server 600.

The storage server 600 may further include one or more power sources 626, one or more wired or wireless network interfaces 650, one or more input/output interfaces 658, one or more keyboards 656, and/or one or more operating systems 641, such as Windows Server™, Mac OS X™, Unix™, Linux™, and FreeBSD™.

The storage server 600 may be configured to perform the steps performed by the storage server in the data storage methods according to the above embodiments.

An embodiment of the present disclosure provides a storage server. The storage server includes a processor and a memory, wherein at least one instruction is stored in the memory stores and loaded and executed by the processor to perform the following operations:

monitoring data transmission status of a data acquisition device, the data acquisition device being configured to transmit acquired data to the storage server;

obtaining data exception information according to the monitored data transmission exceptional status, the data exception information comprising exception start time and exception end time, the exception start time and the exception end time being used to determine an exception time period;

transmitting a first data backhaul request to the data acquisition device, the first data backhaul request comprising the data exception information, the data acquisition device being configured to return first data acquired within the exception time period upon receiving the first data backhaul request; and storing the first data upon receiving the first data.

In one possible implementation, the at least one instruction is loaded and executed by the processor to implement at least one of the following operations:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

In another possible implementation, the at least one instruction is loaded and executed by the processor to implement at least one of the following operations:

generating data exception information when monitoring that the data transmission status of the data acquisition device is exceptional, the data exception information comprising the exception start time; and adding the exception end time into the data exception information when monitoring that the data transmission status of the data acquisition device resumes to normal.

In another possible implementation, the at least one instruction is loaded and executed by the processor to implement at least one of the following operations:

receiving a first data storage task delivered by the management server, the first data storage task comprising a designated data acquisition device identifier and a first time period; and storing data transmitted by a designated data acquisition device within the first time period based on the first data storage task.

In another possible implementation, the at least one instruction is loaded and executed by the processor to implement at least one of the following operations:

transmitting a storage record to the management server, the storage record comprising the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not comprise a second time period within the first time period, the second data storage task comprising the designated data acquisition device identifier and the second time period;

transmitting a second data backhaul request to the designated data acquisition device upon receiving the second data storage task delivered by the management server, the second data backhaul request comprising the second time period, the designated data acquisition device being configured to return second data acquired within the second time period upon receiving the second data backhaul request; and storing the second data upon receiving the second data.

In another possible implementation, the at least one instruction is loaded and executed by the processor to implement at least one of the following operations:

comparing the storage record with the first data storage task, and transmitting a second data backhaul request to the designated data acquisition device when determining that the storage time period does not comprise the second time period within the first time period, the second data backhaul request comprising the second time period, the designated data acquisition device being configured to return second data acquired within the second time period upon receiving the second data backhaul request; and storing the second data upon receiving the second data.

An embodiment of the present disclosure provides a computer-readable storage medium storing at least one instruction. The at least one instruction may be loaded and executed by a processor to realize the operations performed in the above method embodiments. For example, the computer-readable storage medium may be a read-only memory (ROM), a random-access memory (RAM), a compact disc read-only memory (CD-ROM), a magnetic disk, a floppy disk, an optical data storage device or the like.

The at least one instruction is loaded and executed by the processor to implement at least one of the following operations:

monitoring data transmission status of a data acquisition device, the data acquisition device being configured to transmit acquired data to the storage server;

obtaining data exception information according to the monitored data transmission exceptional status, the data exception information comprising exception start time and exception end time, the exception start time and the exception end time being used to determine an exception time period;

transmitting a first data backhaul request to the data acquisition device, the first data backhaul request comprising the data exception information, the data acquisition device being configured to return first data acquired within the exception time period upon receiving the first data backhaul request; and storing the first data upon receiving the first data.

In one possible implementation, the at least one instruction is loaded and executed by the processor to implement at least one of the following operations:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

In another possible implementation, the at least one instruction is loaded and executed by the processor to implement at least one of the following operations:

generating data exception information when monitoring that the data transmission status of the data acquisition device is exceptional, the data exception information comprising the exception start time; and adding the exception end time into the data exception information when monitoring that the data transmission status of the data acquisition device resumes to normal.

In another possible implementation, the at least one instruction is loaded and executed by the processor to implement at least one of the following operations:

receiving a first data storage task delivered by the management server, the first data storage task comprising a designated data acquisition device identifier and a first time period; and storing data transmitted by a designated data acquisition device within the first time period based on the first data storage task.

In another possible implementation, the at least one instruction is loaded and executed by the processor to implement at least one of the following operations:

transmitting a storage record to the management server, the storage record comprising the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not comprise a second time period within the first time period, the second data storage task comprising the designated data acquisition device identifier and the second time period;

transmitting a second data backhaul request to the designated data acquisition device upon receiving the second data storage task delivered by the management server, the second data backhaul request comprising the second time period, the designated data acquisition device being configured to return second data acquired within the second time period upon receiving the second data backhaul request; and storing the second data upon receiving the second data.

In another possible implementation, the at least one instruction is loaded and executed by the processor to implement at least one of the following operations:

comparing the storage record with the first data storage task, and transmitting a second data backhaul request to the designated data acquisition device when determining that the storage time period does not comprise the second time period within the first time period, the second data backhaul request comprising the second time period, the designated data acquisition device being configured to return second data acquired within the second time period upon receiving the second data backhaul request; and storing the second data upon receiving the second data.

Those skilled in the art may understand that all or part of the steps according to the above embodiments may be implemented by hardware, or may be implemented by related hardware instructed by a program, and the program may be stored in a computer-readable storage medium. The storage medium mentioned above may be a read-only memory, a magnetic disk, an optical disk or the like.

Described above are merely exemplary embodiments of the present disclosure, and are not intended to limit the present disclosure. Within the spirit and principles of the disclosure, any modifications, equivalent substitutions, or improvements are within the protection scope of the present disclosure.

The invention claimed is:

1. A data storage method, the method being applied to a storage server in a cloud storage system and comprising:
monitoring data transmission status of a data acquisition device, the data acquisition device being configured to transmit acquired data to the storage server;
obtaining data exception information according to the monitored data transmission exceptional status, the data exception information comprising exception start time and exception end time, the exception start time and the exception end time being used to determine an exception time period;
transmitting a first data backhaul request to the data acquisition device, the first data backhaul request comprising the data exception information, the data acquisition device being configured to return first data acquired within the exception time period upon receiving the first data backhaul request; and
storing the first data upon receiving the first data,
wherein the cloud storage system further comprises a management server, and the method further comprises:
receiving a first data storage task delivered by the management server, the first data storage task comprising a designated data acquisition device identifier and a first time period;
storing, based on the first data storage task, data transmitted by a designated data acquisition device within the first time period;
transmitting a storage record to the management server, the storage record comprising the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not comprise a second time period within the first time period, the second data storage task comprising the designated data acquisition device identifier and the second time period;

transmitting a second data backhaul request to the designated data acquisition device upon receiving the second data storage task delivered by the management server, the second data backhaul request comprising the second time period, the designated data acquisition device being configured to return second data acquired within the second time period upon receiving the second data backhaul request; and storing the second data upon receiving the second data, or wherein the cloud storage system further comprises the management server, and the method further comprises:

receiving a first data storage task delivered by the management server, the first data storage task comprising a designated data acquisition device identifier and a first time period;

storing, based on the first data storage task, data transmitted by a designated data acquisition device within the first time period;

comparing a storage record with the first data storage task, and transmitting a second data backhaul request to the designated data acquisition device when determining that the storage time period does not comprise the second time period within the first time period, the second data backhaul request comprising the second time period, the designated data acquisition device being configured to return second data acquired within the second time period upon receiving the second data backhaul request; and storing the second data upon receiving the second data.

2. The method according to claim 1, wherein the monitoring data transmission status of the data acquisition device comprises at least one of:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

3. The method according to claim 1, wherein the obtaining data exception information according to the monitored data transmission exceptional status comprises:

generating data exception information when monitoring that the data transmission status of the data acquisition device is exceptional, the data exception information comprising the exception start time;

adding the exception end time into the data exception information when monitoring that the data transmission status of the data acquisition device resumes to normal.

4. A storage server, comprising a processor and a memory, wherein at least one instruction is stored in the memory and when loaded and executed by the processor, causes the processor to perform the following operations:

monitoring data transmission status of a data acquisition device, the data acquisition device being configured to transmit acquired data to the storage server;

obtaining data exception information according to the monitored data transmission exceptional status, the data exception information comprising exception start time and exception end time, the exception start time and the exception end time being used to determine an exception time period;

transmitting a first data backhaul request to the data acquisition device, the first data backhaul request comprising the data exception information, the data acquisition device being configured to return first data acquired within the exception time period upon receiving the first data backhaul request; and storing the first data upon receiving the first data, wherein the at least one instruction further causes the processor to perform the following operations:

receiving a first data storage task delivered by a management server, the first data storage task comprising a designated data acquisition device identifier and a first time period;

storing, based on the first data storage task, data transmitted by a designated data acquisition device within the first time period;

transmitting a storage record to the management server, the storage record comprising the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not comprise a second time period within the first time period, the second data storage task comprising the designated data acquisition device identifier and the second time period;

transmitting a second data backhaul request to the designated data acquisition device upon receiving the second data storage task delivered by the management server, the second data backhaul request comprising the second time period, the designated data acquisition device being configured to return second data acquired within the second time period upon receiving the second data backhaul request; and storing the second data upon receiving the second data, or wherein the at least one instruction further causes the processor to perform the following operations:

receiving a first data storage task delivered by a management server, the first data storage task comprising a designated data acquisition device identifier and a first time period;

storing, based on the first data storage task, data transmitted by a designated data acquisition device within the first time period;

comparing a storage record with the first data storage task, and transmitting a second data backhaul request to the designated data acquisition device when determining that the storage time period does not comprise the second time period within the first time period, the second data backhaul request comprising the second time period, the designated data acquisition device being configured to return second data acquired within the second time period upon receiving the second data backhaul request; and storing the second data upon receiving the second data.

5. The storage server according to claim 4, wherein the at least one instruction further causes the processor to implement at least one of the following operations:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

6. The storage server according to claim 4, wherein the at least one instruction further causes the processor to perform the following operations:

generating data exception information when monitoring that the data transmission status of the data acquisition device is exceptional, the data exception information comprising the exception start time; and adding the exception end time into the data exception information when monitoring that the data transmission status of the data acquisition device resumes to normal.

7. A non-transitory computer-readable storage medium, wherein at least one instruction is stored in the computer-readable storage medium and when loaded and executed by a processor, causes the processor to implement the following operations:

monitoring data transmission status of a data acquisition device, the data acquisition device being configured to transmit acquired data to the storage server;

obtaining data exception information according to the monitored data transmission exceptional status, the data exception information comprising exception start time and exception end time, the exception start time and the exception end time being used to determine an exception time period;

transmitting a first data backhaul request to the data acquisition device, the first data backhaul request comprising the data exception information, the data acquisition device being configured to return first data acquired within the exception time period upon receiving the first data backhaul request; and storing the first data upon receiving the first data, wherein the at least one instruction further causes the processor to implement the following operations:

receiving a first data storage task delivered by a management server, the first data storage task comprising a designated data acquisition device identifier and a first time period;

storing, based on the first data storage task, data transmitted by a designated data acquisition device within the first time period;

transmitting a storage record to the management server, the storage record comprising the designated data acquisition device identifier and a corresponding storage time period, the storage time period being a time period during which the data transmitted by the designated data acquisition device has been stored, the management server being configured to compare the storage record with the first data storage task, and deliver a second data storage task when determining that the storage time period does not comprise a second time period within the first time period, the second data storage task comprising the designated data acquisition device identifier and the second time period;

transmitting a second data backhaul request to the designated data acquisition device upon receiving the second data storage task delivered by the management server, the second data backhaul request comprising the second time period, the designated data acquisition device being configured to return second data acquired within the second time period upon receiving the second data backhaul request; and storing the second data upon receiving the second data, or wherein the at least one instruction further causes the processor to implement the following operations:

receiving a first data storage task delivered by a management server, the first data storage task comprising a designated data acquisition device identifier and a first time period;

storing, based on the first data storage task, data transmitted by a designated data acquisition device within the first time period;

comparing a storage record with the first data storage task, and transmitting a second data backhaul request to the designated data acquisition device when determining that the storage time period does not comprise the second time period within the first time period, the second data backhaul request comprising the second time period, the designated data acquisition device being configured to return second data acquired within the second time period upon receiving the second data backhaul request; and storing the second data upon receiving the second data.

8. The non-transitory computer-readable storage medium according to claim 7, wherein the at least one instruction further causes the processor to implement at least one of the following operations:

monitoring whether a data link between the storage server and the data acquisition device is normal or not;

monitoring whether data transmitted by the data acquisition device is normal or not;

monitoring whether the data transmitted by the data acquisition device is normally written to the storage server or not.

9. The non-transitory computer-readable storage medium according to claim 7, wherein the at least one instruction further causes the processor to perform the following operations:

generating data exception information when monitoring that the data transmission status of the data acquisition device is exceptional, the data exception information comprising the exception start time; and adding the exception end time into the data exception information when monitoring that the data transmission status of the data acquisition device resumes to normal.

* * * * *